United States Patent [19]

Hodgins et al.

[11] 4,436,365

[45] Mar. 13, 1984

[54] DATA LINK USING INTEGRATED OPTICS DEVICES

[75] Inventors: Martin G. Hodgins, Yorktown Heights, N.Y.; William J. Jordan, Whippany, N.J.

[73] Assignee: Bell Telephone Laboratories, Incorporated, Murray Hill, N.J.

[21] Appl. No.: 313,600

[22] Filed: Oct. 21, 1981

[51] Int. Cl.³ .............................................. G02B 5/174
[52] U.S. Cl. ............................... 350/96.16; 350/96.14; 350/96.15; 455/612
[58] Field of Search ................ 350/96.13, 96.14, 96.15, 350/96.16; 455/605, 606, 610, 612; 367/140, 141, 149

[56] References Cited

U.S. PATENT DOCUMENTS

| 4,012,113 | 3/1977 | Kogelnik et al. | 350/96.13 |
| 4,165,150 | 8/1979 | Duck et al. | 350/96.15 |
| 4,182,935 | 1/1980 | Chown | 350/96.15 X |
| 4,264,126 | 4/1981 | Sheem | 350/96.15 |
| 4,320,475 | 3/1982 | Leclerc et al. | 350/96.14 X |
| 4,330,170 | 5/1982 | Johnson et al. | 350/96.16 |

FOREIGN PATENT DOCUMENTS

| 52-32347 | 3/1977 | Japan | 350/96.15 |
| 1373956 | 11/1974 | United Kingdom | 350/96.14 |

OTHER PUBLICATIONS

Minemura et al., "Two-Way Transmission Experiments Over a Single . . . ", *Electr. Lett.*, vol. 14, No. 11, May 1978, pp. 340–342.

Kaminow et al., "Modulation Techniques", *Optical Fiber Telecommunications,* Academic Press, 1979, Chap. 17, pp. 557–582.

Drake, "Low Reflectance Terminations and Connections for Duplex . . . ", *Applied Optics,* vol. 20, No. 9, May 1981, pp. 1640–1644.

*Primary Examiner*—John D. Lee
*Attorney, Agent, or Firm*—J. P. Kearns

[57] ABSTRACT

A transmission link is established between remote electrical transducers, e.g., underwater, and a monitoring receiver, e.g., shore-based, over an optical fiber link using integrated optical waveguides. Optical directional couplers with absorber and reflector elements incorporated in the waveguides at respective terminals of the transmission link permit the injection of light into the fiber at the monitoring terminal and the modulation of reflected light at the transducer terminal in accordance with an electrical signal from the transducer. No electrical energy then needs to be transmitted between the monitoring and transducing terminals of the transmission link. The link itself is thus light in weight and free of electrical currents subject to electromagnetic interference.

10 Claims, 5 Drawing Figures

DATA LINK USING INTEGRATED OPTICS DEVICES

FIELD OF THE INVENTION

This invention relates generally to the transmission of signals by lightwaves traveling through optical fibers and, more particularly, to the modulation of reflected light originating at a near terminal by electrical signals at the far terminal for return lightwave transmission to the near terminal.

BACKGROUND OF THE INVENTION

Communication by lightwaves over ultra-thin lightweight glass fibers using bursts of light is becoming more and more a common occurrence. Efficient optical systems are being put to use in telephone and other communication systems, including undersea cable systems.

An optical communication system requires several basic devices. Most basic are a light source and channeling devices, such as, optical fibers and waveguides. In addition, devices are needed for encoding, decoding and switching between electric waves and lightwaves. Light sources are available in the form of lasers and light-emitting diodes (LED). Encoders and decoders are effected by electrooptic and magnetooptic materials; such as, lithium niobate, gallium arsenide and iron garnets. Switching is achieved by placing sections of ultrathin waveguides in close proximity to each other. Transfer of lightwaves to and from such waveguides is accomplished through prisms and diffraction gratings. Transfer of lightwaves between neighboring waveguide sections is accomplished by evanescent waves, i.e., waves extending beyond the boundaries of the waveguide proper.

It is an object of this invention to provide an optical data link connecting an analog electrical transducer to a remote monitor through an optical fiber without having to supply electric power to the modulator at the transducer site.

It is another object of this invention to provide direct modulation of the lightwave passing through an optical fiber by means of an integrated optics device.

It is still another object of this invention to reduce significantly the length of the optical fibers in a transmission link between a monitoring location and a remote signaling source.

SUMMARY OF THE INVENTION

An optical fiber data link according to this invention comprises a light source, a lightwave receiver and a directional coupler at a near terminal of an optical fiber transmission line and an integrated optics switch at a far terminal thereof. The directional coupler can be implemented in the alternative in either an active, i.e., requiring electrooptic switching, form or a passive form. An an integrated optics device the coupler switch further comprises first and second waveguides one of which provides a through transmission path and the other of which terminates at one end in light-absorbing or nonreflecting material and at the other end in a photodetecting receiver. In the passive form the directional coupler comprises a second optical fiber twisted around and fused to the through fiber and a termination of the second fiber in light-absorbing material. The integrated optics switch at the far terminal further comprises a main waveguide terminating at one end in an optical reflector and an auxiliary waveguide terminating at both ends in light-absorbing or nonreflecting material.

In the optical switch the two waveguide elements are brought into close proximity for the appropriate transfer lengths for evanescent light energy in one waveguide to transfer into the other and to continue traveling in the same propagation direction. In the optical switch at the near terminal, accordingly, reflected light energy is switched to a lightwave receiver and outgoing energy is unimpeded. In the optical switch at the far terminal direct light energy is absorbed in the nonreflective terminations of the auxiliary waveguide section, while reflected light energy is modulated by electrical energy from the transducer.

Active optical switches require electric fields to control the direction of the transfer of light energy between waveguides. The passive directional coupler is formed by fusing the fibers from the two waveguides. In the illustrative example sound energy is transformed into electrical energy in the transducer.

Advantages of the optical data transmission link of this invention include:

(1) monitoring of condition and status sensors in high-voltage environments without conductive wired connections;

(2) monitoring of condition and status sensors in environments subject to electromagnetic interference;

(3) monitoring of condition and status sensors in confined spaces which preclude the use of heavier metallic conductors;

(4) monitoring of sound transducers in remote locations, such as, undersea environments; and (5) monitoring a plurality of sensors from a remote central site.

BRIEF DESCRIPTION OF THE DRAWING

The above objects, features and advantages of this invention will be better appreciated from the ensuing detailed description and the drawing in which.

DESCRIPTION OF THE ILLUSTRATIVE EMBODIMENT

As part of national defense preparedness a program of underwater sound monitoring of surface ships and submarines has been in existence for many years in coastal waters. The listening devices employed in this program are hydrophones, or underwater microphones, usually set out in bottom or other subsurface arrays. Underwater sounds are converted into electrical signals by these hydrophones for relay to surface monitors by means of submarine cables.

Figure 1:
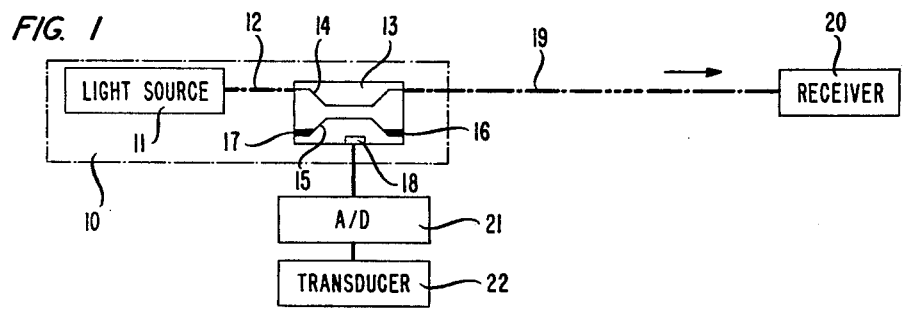
FIG. 1 is a block diagram of a one-way optical transmission link employing a digital modulator known to the prior art.

FIG. 1 depicts a one-way lightwave transmission system employing optical fiber 19 as a link between modulator 10 and receiver 20. Modulator 10 comprises light source 11 and directional coupler 13. Light source 11 is advantageously a semiconductor laser employing alloys, such as gallium arsenide or indium phosphide, in "n" and "p" type layers separated by an undoped intermediate layer. Light is generated by the presence of an intense electric field. Directional coupler 13 comprises waveguide strips 14 and 15 embedded in the same substrate as light source 11. Main waveguide 14 propagates light from source 11 into optical fiber 19. Auxiliary waveguide 15 is terminated at its respective ends in light absorbent or nonreflective materials 16 and 17. Both waveguides are brought into coupling proximity of each other for the requisite transfer distance and are under the influence of an electric field developed at electrode 18.

Transducer 22 by way of illustration can be a sound receptor which generates an analog electrical wave proportional to the undulations of a sound wave. The analog electrical wave is converted into digital pulses of proportional amplitude at sampling instants for the purpose of pulsing electrode 18 in modulator 10. The pulsed electrical field thus generated alters the indices of refraction of waveguides 14 and 15, thereby shifting the degree of coupling between them proportionately to the pulse amplitudes. In this manner the continuous light output of source 11 is intensity modulated in accordance with the sampled pulse amplitudes of the electric wave from transducer 22. The pulsed lightwave from modulator 10 is transmitted along optical fiber 19 to receiver 20 where a photodetector transforms the light energy into electrical energy for digital to analog conversion to an electric wave.

Figure 2:
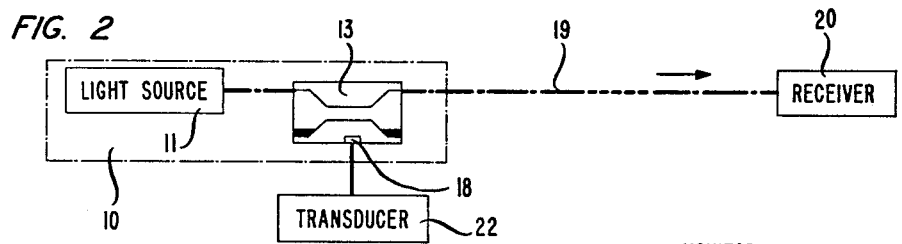
FIG. 2 is a block diagram of a one-way optical transmission link employing analog modulation.

FIG. 2 depicts the same one-way lightwave transmission system shown in FIG. 1, but modified by the omission of analog-to-digital converter 21 to intensity modulate the output of light source 11 in analog fashion. The analog modulator of FIG. 2 comprises light source 11 directional coupler 13 and transducer 22 at the transmitting end of light fiber 19 and receiver 20 at the opposite end of light fiber 19. Elimination of converter 21 also greatly reduces the operating power requirement at the transmitting end of the system.

This invention relates specifically to an improvement in a transmission link between relatively low-frequency signal sources and monitoring receivers particularly where the signal source is located in a remote or hazardous location. A remote signal source can be part of an underwater sound surveillance system where it is inconvenient or awkward to supply operating power to hydrophone amplifiers located many miles from a monitoring station. A hazardous signal source can be located in an explosive atmosphere at a chemical plant where the possibility of electric sparks causing an unplanned detonation is to be minimized at all cost.

Figure 3:
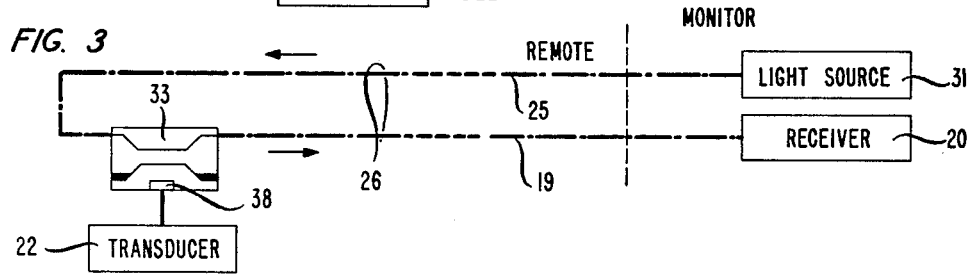
FIG. 3 is a block diagram of a data link connecting a remote transducer through two optical fibers to a monitoring location where the light source is situated.

The optical fiber transmission system shown in FIG. 3 comprises light source 31 and lightwave receiver 20 located at a monitoring station, to the right of the broken vertical line, transducer 22 and directional coupler 33 with electrode 38 and transducer 22 located at a remote transmitting location to the left of the broken vertical line and optical fibers 25 and 19 forming a two-way link between monitoring and transmitting locations. The continuous lightwave from light source 31, which can advantageously be coherent light of a single frequency, traverses optic fiber 25, directional coupler 33, optic fiber 19 and receiver 20. Fibers 19 and 25 can be bundled, as shown, into a single cable 26. Transducer 22 provides an electrical signal to electrode 38 in integrated directional coupler 33 which diverts a proportionate amount of light from source 31 into the auxiliary waveguide portion of the coupler so that the light returning over fiber 19 to receiver 20 is effectively modulated by the electric signal from transducer 22. Directional coupler 33 can be constructed in the form of an integrated optics switch in which two parallel waveguide channels are diffused as a thin film of titanium or zinc sulfide into a substrate of optical material, such as, lithium niobate. When adjacent parallel channels are brought into proximity within the evanescent light fields of each other for the appropriate coupling or transfer length, light traveling in one strip channel can be transferred to its neighbor under the constraint of proper phase matching. Further, by means of the electrooptic effect in which parallel electrodes are implanted in the vicinity of the waveguide channels the refractive index of the latter can be controlled. Changes in the refractive index can be accomplished in accordance with an electrical signal applied to the electrodes with the result that not only is the degree of coupling between waveguides controlled, but also the wavelength of the light traversing the waveguide.

Directional coupler 33 in FIG. 3 shows waveguide channels brought into close proximity for the appropriate coupling length to effect transfer of lightwaves between them. Light continues to propagate in the same direction in the transferee channel as in the transferor channel. Thus, light from light source 31 injected into the upper waveguide on the left and traveling to the right is coupled into the auxiliary waveguide, as well as continuing onto optical fiber link 19. The lower waveguide, however, is terminated at its ends in light absorbing material containing typically a blackening material. The lower waveguide is under the influence of the electric field of electrode 38 so that its index of refraction is varied in accordance with the electric signal from transducer 22. As the index of refraction is changed, the equivalent amount of lightwave energy from source 31 is diverted to the auxiliary waveguide and absorbed by its darkened terminations. Thus, the lightwave returning on optic fiber 19 to receiver 20 is no longer a continuous unmodulated wave, but is intensity modulated in accordance with the signals from transducer 22.

It is to be noted that no electric power subject to ohmic loss or electric signals subject to electromagnetic interference need be supplied on the transmission link as would be required with a metallic transmission link.

Figure 4:
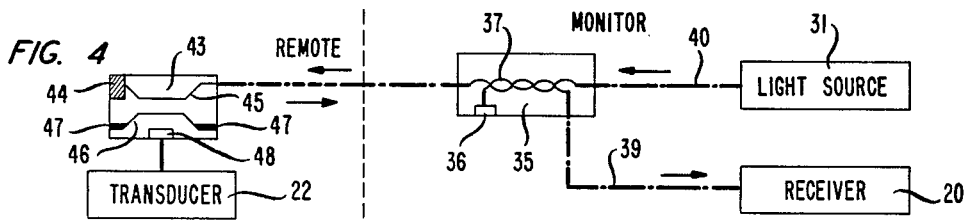
FIG. 4 is a block diagram of a data link according to this invention connecting a remote transducer through a single optical fiber and a passive directional coupler to a monitoring location where the light source is situated.

It has been discovered that the outgoing lightwave and the incoming lightwave of FIG. 3 can be combined without interference in a common fiber. FIG. 4 shows an improved transmission link according to this invention in which the long-distance connection between the monitoring station and the remote location is implemented by a single optic fiber. The monitor location to the right of the broken vertical line comprises light source 31, receiver 20 and coupler 35. Coupler 35 is of the star type in which optical fibers 39 and 40 connected respectively to receiver 20 and light source 31 are twisted together and fused such that there is continuous passive light transfer between them. The remote location to the left of the broken vertical line comprises directional coupler 43 and transducer 22. The monitor and remote locations are joined by single optical fiber 41, which in an undersea surveillance system can be measured in miles.

Directional coupler 43 in FIG. 4 differs from directional coupler 33 in FIG. 3 in having the far end of main waveguide 45 terminated in reflective material 44. Auxiliary waveguide 46 is terminated as before by nonreflective or absorbing material 47 at both ends. The degree of coupling between the two waveguides continues to be controlled by the electric field about electrode 48 according to the electrooptic effect.

The arrangement of FIG. 4 eliminates the need for separate outgoing and incoming transmission lines between the monitor and remote locations. Continuous light from source 31 traverses optical fiber 40, coupler 35, fiber 41 and coupler 43, where it is reflected back toward its source. The portion of the outgoing lightwave coupled into fiber 39 at star coupler 35 if invariant and absorbed in light-absorbent material 36. At remote coupler 43 the coupling between the continuous lightwave in main waveguide 45 and auxiliary waveguide 46 is controlled by the electric field from transducer 22 on electrode 48 so that the lightwave reflected back to the monitor location is no longer a continuous wave, but is modulated in intensity by the portion of the lightwave that is absorbed in terminations 47 of auxiliary waveguide 46. The modulated reflected lightwave returning over fiber 41 is coupled into fiber 39 at star coupler 35 at the monitor location and delivered to receiver 20.

When transducer 22 is a passive element with sufficient signal output, no electric power whatsoever is required at the remote location. Thus, should the remote location constitute a hazardous or explosive environment, no danger is occasioned where the transmission link is embodied in optical fiber according to this invention. Furthermore, the length of optical fiber required in the arrangement of FIG. 4 is about half that required in the arrangement of FIG. 3.

Figure 5:
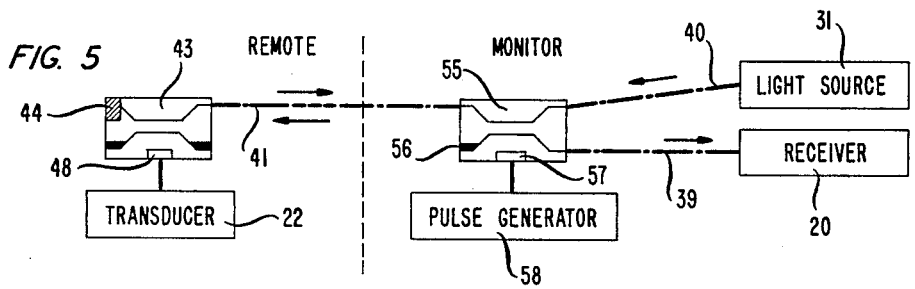
FIG. 5 is a block diagram of a data link according to this invention for connecting a remote transducer through a single optical fiber and an active integrated optics switch to a monitoring location where the light source is situated.

FIG. 5 shows an alternative to the optical transmission link of FIG. 4 in which active directional coupler 55 replaces passive star coupler 35. At the monitor location light source 31, receiver 20 and optical fiber 39 and 40 are unchanged. Directional coupler 55, however, is similar in structure to coupler 33 in FIG. 3 in that two embedded waveguides are formed in coupling proximity to each other and are under the influence of the electric field from electrode 57. The electric field is maintained by pulse generator 58. At the remote location directional coupler 43 and transducer 22 are unchanged. Optic fiber 41 is also unchanged.

The arrangement of FIG. 5 operates on the radar principle in that a pulse of light in effect is allowed to pass periodically from light source 31 to remote coupler 43 and thereafter receiver 20 awaits reflected light which may have been encoded or modulated. Typically, in the absence of an electric field there is no net transfer of lightwave energy between the parallel waveguides. However, as the electric field increases interguide transfer increases also. Accordingly, during the presence of the field created by pulse generator 58 most of the lightwave energy outgoing from source 31 transfers from the main to the auxiliary waveguide in coupler 55 and is absorbed by absorbent material 56. However, when pulse generator 58 is turned off momentarily, a pulse of light passes along optical fiber 41 to remote coupler 43 and any modulated lightwave energy reflected from reflecting material 44 transfers nearly completely at coupler 55 into receiver 20 over fiber 39 provided that the width of the pulse generator off pulse is shorter than the round trip transit time of light in fiber 41 and remote coupler 43. The arrows along optic fibers 39, 40 and 41 indicate the directions of lightwave propagation.

Where transducer 22 is implemented by one or more hydrophones in an underwater surveillance system, amplification is normally required. Power is then independently supplied by a battery of known lifetime to the hydrophones themselves. No electric power is supplied to the optical transmission link of this invention at the remote location, however. The only active elements in the system of FIG. 4 are light source 31 and receiver 20. In FIG. 5 pulse generator 58 is also powered. These powered elements are located to the right of the broken vertical line at the monitor which is at a manned position.

While this invention has been described in terms of its application to lightwave transmission by means of optical fibers, its principles are as well applicable to the transmission of electromagnetic waves at microwave frequencies through such media was waveguides and directional couplers. Numerous applications of these principles will occur to those skilled in the signal transmission arts within the spirit and scope of the appended claims.

What is claimed is:

1. A signal transmission system providing a data link between first and second terminals therefor comprising first and second directional couplers including main and auxiliary channels in cross-coupling proximity at the respective terminals of said system, a signal source at said first terminal for providing continuous waves through said main channel in said first directional coupler to said data link, a receiver at said first terminal accepting signal waves from said auxiliary channel in said first directional coupler, a reflector at said second terminal for signal waves incoming from said data link to said main channel in said second directional coupler, and external signaling means at said second terminal for modulating reflected signal waves in said auxiliary channel in said second directional coupler.

2. The signal transmission system of claim 1 in which said data link is an optical fiber and said signals are lightwaves.

3. A signal transmission system including at least one optical fiber as the medium of transmission comprising first and second terminals for said transmission system, first and second optical couplers including main and auxiliary channels in cross-coupling proximity at the respective terminals of said transmission system, a light source at said first terminal for providing continuous lightwaves through said main channel in said first optical coupler for an optical fiber, a receiver at said first terminal accepting lightwaves from said auxiliary channel in said first optical coupler, a reflector at said second terminal for lightwaves incoming from an optical fiber to said main channel in said second optical coupler, and electrical signaling means at said second terminal for modulating reflected lightwaves in said auxiliary channel in said second optical coupler.

4. The signal transmission system of claim 3 in which the main and auxiliary channels of said first optical coupler comprise a pair of optical fibers twisted and fused together as a star coupler and a light-absorptive termination for an end of one of the twisted fibers.

5. The signal transmission system defined in claim 4 in which said auxiliary channel in said second optical coupler is terminated at each end in a nonreflective light absorber whereby modulated reflected waves only are transferred back into the main channel thereat.

6. The signal transmission system of claim 3 in which the main and auxiliary channels of said first and second optical couplers comprise waveguides integrated into a substrate of electrooptic material.

7. The signal transmission system defined in claim 3 in which the channels in at least said second optical coupler comprise a pair of parallel waveguides in cross-coupling proximity for a transfer distance sufficient for evanescent light to transfer between the main and auxiliary channels, and said auxiliary channels include light-absorbent material at one or both ends to prevent lightwave reflection thereat.

8. The signal transmission system defined in claim 3 in which said main channel in said first optical coupler provides a through light path between said light source and said optical fiber and said main channel in said second optical coupler provides a through light path between said optical fiber and said reflector.

9. The signal transmission system defined in claim 3 in which said auxiliary channel in said first optical coupler provides a continuous light path between said receiver and a light absorber whereby modulated reflected lightwaves only are directed to said receiver and direct lightwaves from said light source are prevented from reaching said receiver.

10. In combination with an optical fiber transmission line:

a light source, a lightwave receiver, a first integrated optical coupler having a main waveguide channel forming a direct path for lightwaves between said light source and said transmission line and an auxiliary waveguide channel for coupling return lightwaves from said main waveguide channel into said receiver, a lightwave reflector, a electric wave source, and a second integrated optical coupler having a main waveguide channel forming a direct path for lightwaves between said transmission line and said reflector and an auxiliary waveguide channel for coupling reflected lightwaves modulated by electric waves from said electric wave source into said main waveguide channel of said second integrated optical coupler.

* * * * *